(12) United States Patent
Ohkawa

(10) Patent No.: US 10,637,103 B2
(45) Date of Patent: Apr. 28, 2020

(54) SODIUM-SULFUR BATTERY

(71) Applicant: YUGENKAISHA CHUSEIGIKEN, Nisshin-shi (JP)

(72) Inventor: Hiroshi Ohkawa, Nisshin (JP)

(73) Assignee: YUGENKAISHA CHUSEIGIKEN, Nisshin-shi (JP)

( * ) Notice: Subject to any disclaimer, the term of this patent is extended or adjusted under 35 U.S.C. 154(b) by 140 days.

(21) Appl. No.: 15/760,271

(22) PCT Filed: Oct. 3, 2016

(86) PCT No.: PCT/JP2016/079300
§ 371 (c)(1),
(2) Date: Mar. 15, 2018

(87) PCT Pub. No.: WO2017/061378
PCT Pub. Date: Apr. 13, 2017

(65) Prior Publication Data
US 2018/0287216 A1    Oct. 4, 2018

(30) Foreign Application Priority Data

Oct. 6, 2015    (JP) ................................. 2015-198381

(51) Int. Cl.
*H01M 10/39* (2006.01)
*H01M 4/38* (2006.01)
*H01M 4/02* (2006.01)

(52) U.S. Cl.
CPC ....... *H01M 10/3945* (2013.01); *H01M 4/381* (2013.01); *H01M 10/39* (2013.01);
(Continued)

(58) Field of Classification Search
CPC ....................................... H01M 10/3909–3981
See application file for complete search history.

(56) References Cited

U.S. PATENT DOCUMENTS

| 3,915,741 A | 10/1975 | Kogiso et al. |
| 4,048,393 A | 7/1977 | Heintz et al. |
| 2013/0065098 A1 | 3/2013 | Ohkawa |

FOREIGN PATENT DOCUMENTS

| EP | 0 633 420 A2 | 1/1995 |
| EP | 2 579 380 A1 | 4/2013 |

(Continued)

OTHER PUBLICATIONS

Machine translation of JP 59-146170 A (Year: 1984).*

(Continued)

*Primary Examiner* — Robert S Carrico
(74) *Attorney, Agent, or Firm* — Oblon, McClelland, Maier & Neustadt, L.L.P.

(57) ABSTRACT

A sodium-sulfur battery includes a partition wall formed of a solid electrolyte, a cathode chamber formed on one of opposite sides of the partition wall, an anode chamber formed on another one of the opposite sides of the partition wall, sulfur accommodated in the cathode chamber, sodium some of which is accommodated in the anode chamber, a sodium container accommodating most of remaining sodium, and a communication passage communicating the anode chamber with the sodium container, and including a finely-perforated portion extending into the sodium container and opening inside the sodium container. Moreover, the communication passage further includes a shutoff portion for closing the communication passage itself.

4 Claims, 3 Drawing Sheets

(52) U.S. Cl.
CPC .. *H01M 10/3918* (2013.01); *H01M 2004/027* (2013.01); *H01M 2200/00* (2013.01); *H01M 2300/0071* (2013.01)

(56) References Cited

FOREIGN PATENT DOCUMENTS

| | | | |
|---|---|---|---|
| FR | 2363910 | A1 | 3/1978 |
| GB | 1 474 272 | A | 5/1977 |
| JP | 50-33420 | | 3/1975 |
| JP | 50-38030 | | 4/1975 |
| JP | 50-154733 | | 12/1975 |
| JP | 53-32333 | | 3/1978 |
| JP | 59146170 | A * | 8/1984 |
| JP | 59-158273 | U | 10/1984 |
| JP | 60-12681 | A | 1/1985 |
| JP | 08148181 | A * | 6/1996 |
| RU | 2 030 036 | C1 | 2/1995 |
| RU | 2 087 998 | C1 | 8/1997 |
| WO | 2011/152028 | A1 | 12/2011 |

OTHER PUBLICATIONS

Machine translation of JP 08-148181 A (Year: 1996).*
International Search Report dated Nov. 22, 2016 in PCT/JP2016/079300 filed Oct. 3, 2016.
Notification of Allowance dated Dec. 27, 2018 in Russian Patent Application No. 2018112248 with English translation, 5 pages.
Japanese Office Action dated on Sep. 24, 2019 in Patent Application No. 2015-198381 (with English machine translation), 8 pages.

* cited by examiner

SODIUM-SULFUR BATTERY

TECHNICAL FIELD

The present invention relates to a sodium-sulfur battery.

BACKGROUND ART

As a secondary battery with a high capacity, a sodium-sulfur battery has been known. In the sodium-sulfur battery, molten sulfur makes a cathode active material, molten sodium makes an anode active material, solid-electrolyte beta-alumina, through which sodium ions $Na^+$ permeate, makes a partition wall that isolates the molten sulfur and molten sodium from one another. Moreover, the molten salt, namely, a cathode active material, is accommodated in a cathode chamber; the molten sodium, namely, an anode active material, is accommodated in an anode chamber. The cathode chamber and anode chamber are connected electrically with the cathode terminal and anode terminal of the sodium-sulfur battery, respectively.

When discharging the sodium-sulfur battery, the sodium Na in the anode chamber separates into electrons and sodium ions $Na^+$. The electrons flow from the anode terminal to the outside; the sodium ions $Na^+$ permeate through the partition wall to move to the cathode chamber. In the cathode chamber, the cathode terminal donates electrons, the donated electrons, the sodium ions $Na^+$, and molten sulfur S react chemically with each other to generate sodium polysulfide $Na_2S_x$. When charging the sodium-sulfur battery, reactions, which reverse the reactions during the discharging operation, occur. During the charging operation, sodium ions $Na^+$ and sulfur S generate from the sodium polysulfide $Na_2S_x$, and then the sodium ions $Na^+$ permeate through the partition wall to move from the cathode chamber to the anode chamber in the process. That is, the sodium ions $Na^+$, which permeate through the partition wall, move from the anode chamber to the cathode chamber during the discharging operation, but move from the cathode chamber to the anode chamber during the charging operation. The sodium-ion battery operates at a high temperature falling in a range of from 290 to 350° C., because it is necessary that all of the molten sulfur and molten sodium in the sodium-ion battery, namely, the active materials, are in a molten state, namely, to be a liquid, respectively.

In the sodium-sulfur battery broken due to any cause, a large amount of the molten sodium makes contact with a large amount of the molten sulfur to react with one another so that the reaction generates heat in a large amount. Patent Literature No. 1 discloses a sodium-sulfur battery which is capable of preventing the molten sodium from flowing out in a large amount. The sodium-sulfur battery comprises a sodium container disposed independently of the anode chamber, accommodating most of the sodium, and made of a metal which is less likely to be fractured. Moreover, the sodium container is connected with the anode chamber by a long and fine communication tube functioning as a sodium passage.

In the process of the charging and discharging reactions, the sodium ions $Na^+$ move from the cathode chamber to the anode chamber, or from the anode chamber to the cathode chamber, by way of the partition wall. Since the anode chamber communicates with the sodium container, the increase and decrease in the sodium amount within the anode chamber result in the decrease and increase in the sodium amount within the sodium container. That is, the sodium moves from the anode chamber to the sodium container so as to always fill up the anode chamber with the sodium. The anode chamber accommodates the sodium in a small amount. In short, the sodium container, which is made of a metal being less likely to be fractured, accommodates most of the sodium. Besides, the long and fine communication tube connects the sodium container with the anode chamber.

Thus, even if the partition wall demarcating the anode chamber should have been broken, the molten sodium is managed to flow out from the anode chamber in a small amount. Moreover, since the sodium container, which is made of a metal being less likely to be fractured, accommodates most of the molten sodium, and since the long and fine communication tube refrains the molten sodium from flowing out to the outside, the molten sodium is less likely to flow out to the outside. Accordingly, most of the molten sodium neither makes contact with the molten sulfur nor reacts with it. Consequently, even if the partition wall should have been broken, the broken partition is less likely to lead to the generation of heat in a large amount, and is unlikely to result in a fire. Note that the sodium-sulfur battery, which should have been broken to terminate the functions, involves a decrease in the temperature. The temperature decrease however turns both of the molten sodium and sodium polysulfide in the form of liquid into their stable solids, which surely makes chances of the reaction between sodium and sulfur disappear.

RELATED TECHNICAL LITERATURE

Patent Literature

Patent Literature No. 1: Japanese Unexamined Patent Publication (KOKAI) Gazette No. 50-38030

SUMMARY OF THE INVENTION

Assignment to be Solved by the Invention

A sodium-sulfur battery has been required to be much safer when being damaged. Moreover, the sodium-sulfur battery disclosed in Patent Literature No. 1 comprises the long communication tube connecting the cathode container, which accommodates the molten sulfur and the partition wall including the solid electrolyte, with the sodium container. The arrangement of the long communication tube causes problems when making the cathode container and sodium container closer to one another, or when disposing the sodium container within the cathode chamber, in order to make the sodium-sulfur battery compactor. Besides, the long communication tube, which is present outside the cathode container and sodium container, might possibly be damaged when assembling the sodium-sulfur battery.

The present invention has been made in view of the above-mentioned circumstances. Hence, it is an assignment to the present invention to provide a safe sodium-sulfur battery from which sodium does not flow out at once, and which is less likely to be damaged.

Means for Solving the Assignment

For the purpose of achieving the aforementioned object, a first sodium-sulfur battery according to the present invention comprises:
a partition wall formed of solid-electrolyte beta-alumina;
a cathode chamber formed on one of opposite sides of the partition wall;

an anode chamber formed on another one of the opposite sides of the partition wall;
sulfur accommodated in the cathode chamber;
sodium some of which is accommodated in the anode chamber;
a sodium container accommodating most of remaining sodium; and
a communication passage including a finely-perforated portion which communicates the anode chamber with the sodium container;
wherein the communication passage further includes an anode chamber-sodium container connection segment communicating the anode chamber with the sodium container, and an internal-sodium container segment formed of a tubule, elongating inside the sodium container, and opened on an internal lower side of the sodium container.

Another sodium-sulfur battery according to the present invention comprises:
a partion wall formed of solid-electrolyte beta-alumina;
a cathode chamber formed on one of opposite sides of the partition wall;
an anode chamber formed on another one of the opposite sides of the partition wall;
sulfur accommodated in the cathode chamber;
sodium some of which is accommodated in the anode chamber;
a sodium container accommodating most of remaining sodium; and
a communication passage including a finely-perforated portion which communicates the anode chamber with the sodium container;
wherein the communication passage further includes: a shut-off means provided with: a finely-constricted portion; and a float whose density is higher than that of sodium and is lower than those of sulfur and sodium sulfide, and which closes the finely-constricted portion by being floated with the sulfur or sodium sulfide infiltrating into the communication passage through a damaged site occuring if the partition wall should have been damaged.

The communication passage, which extends into the sodium container and opens in the sodium container, not only resolves the problem resulting from the arrangement of the conventional long communication tube, but also makes the first and second sodium-sulfur batteries according to the present invention unlikely to suffer from any damage due to the conventional long communication tube that is present outside the cathode container and sodium container.

Moreover, a shutoff means, which is disposed in the communication passage and which includes the float chamber, the finely-constricted portion and the float, is able to reliably prevent a flow of the molten sulfur into the sodium container through the communication passage, flow which might possibly be caused by the partition wall if it should have been damaged. Thus, the shutoff means is able to more reliably prevent a large amount of the molten sulfur and a large amount of the molten sodium from making contact with one another, enhancing the first and second sodium-sulfur batteries according to the present invention in the safety. In addition, the communication passage, which includes: the fine-perforated portion extending into the sodium container and opening inside the sodium container; and a shutoff means disposed in the communication passage to close it, not only resolves the problem associated with the arrangement of the conventional long communication tube, but also is capable of making the first and second sodium-sulfur batteries according to the present invention unlikely to suffer from any damage due to the conventional long communication tube that is present outside the cathode container and sodium container, enhancing the first and second sodium-sulfur batteries according to the present invention more in the safety.

The present invention allows that the finely-perforated portion making the communication passage includes a tubule. Moreover, the present invention permits that the partition wall includes a plate-shaped body; the anode chamber is formed inside the plate-shaped body; the cathode chamber is formed on an outer circumferential side of the plate-shaped body; the sodium-sulfur battery further comprises a sulfur container accommodating the partition wall therein, and also demarcating the cathode chamber; and the sulfur is accommodated within the cathode chamber in the sulfur container.

In addition, the present invention allows that the partition wall includes a tube-shaped body opened at an upper end thereof and closed at a lower end thereof; the sodium container has a lower segment, at least the lower segment located on an inner side of the tube-shaped body; the anode chamber is formed between an inner peripheral face of the tube-shaped body and a lower outer peripheral face of the sodium container; the sodium-sulfur battery futher comprises a sulfur container accommodating the partition wall therein and demarcating the cathode chamber; the sulfur is accommodated within the cathode chamber in the sulfur container; and the communication passage has an end opened on an upper side of the anode chamber, and another end opened on a lower side of the sodium container.

Moreover, the present invention permits that the communication passage is formed of a tubule penetrating through the sodium container to have an opening opened on an upper side of the anode chamber, and also coming from the opening downward inside the sodium chamber to have another opening opened on a lower side of the sodium container.

The sodium-sulfur batteries according to the present invention relates to improvements on the conventional long communication tube communicating the anode chamber with the sodium container. Conventional constituent parts, such as the partition wall, the container and so on, are usable for making the constituent parts of the present sodium-sulfur batteries except for the communication passage.

Effect of the Invention

The first sodium-sulfur battery according to the present invention is more enhanced in the safety, because it is not only free of the problem due to the arrangement of the conventional long communication tube but also is unlikely to suffer from any damage resulting from the conventional long communication tube that is present outside the cathode container and sodium container.

The second sodium-sulfur battery according to the present invention further comprising the shutoff means, which is disposed in the communication passage to close it, is able to reliably prevent a flow of the molten sulfur into the sodium container through the communication passage, flow which might possibly be caused by the partition wall if it should have been damaged.

MODE FOR CARRYING OUT THE INVENTION

First Embodiment

Figure 1:
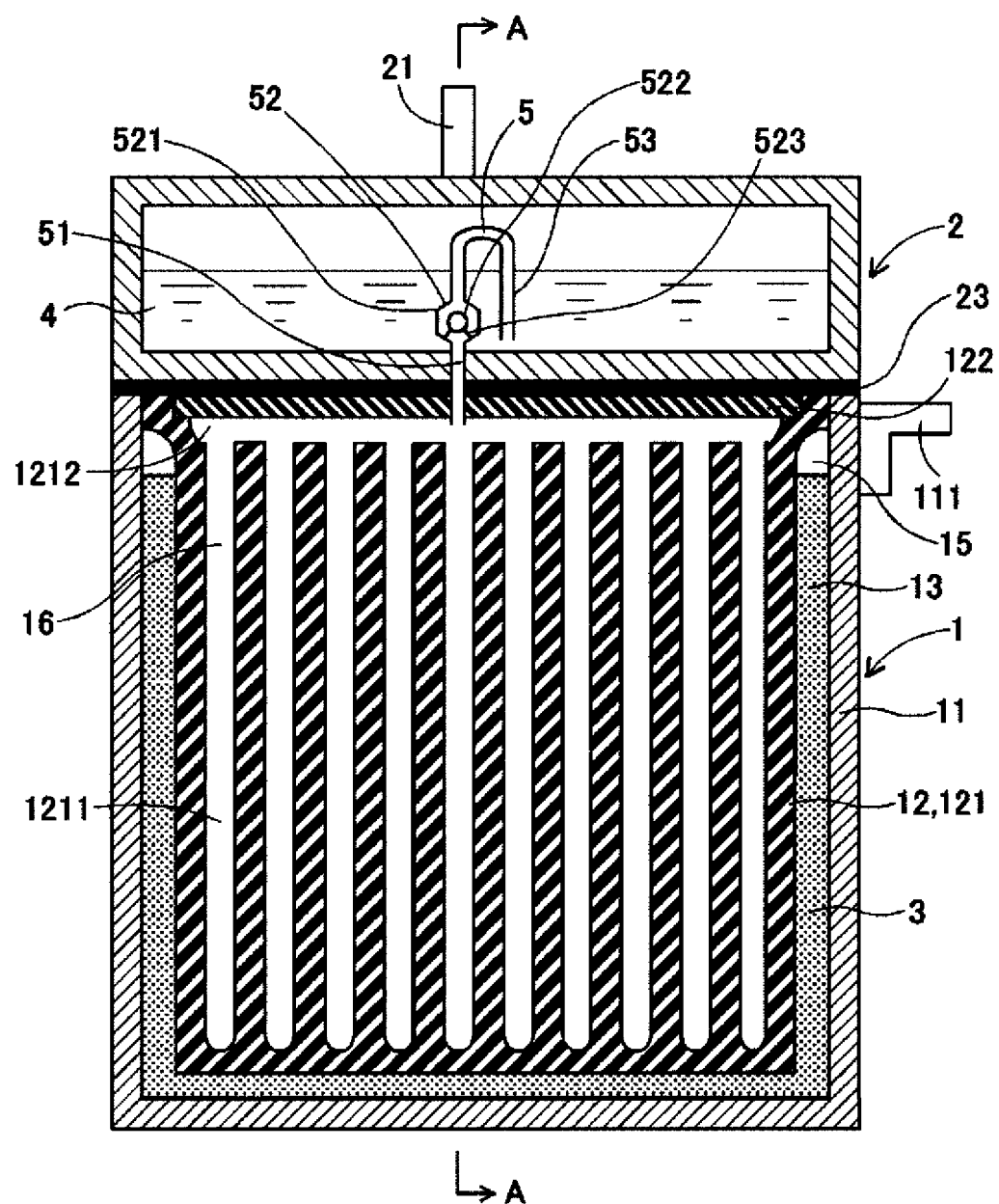
FIG. 1 is a vertical cross-sectional diagram of a sodium-sulfur battery 1 directed to First Embodiment.
Figure 2:
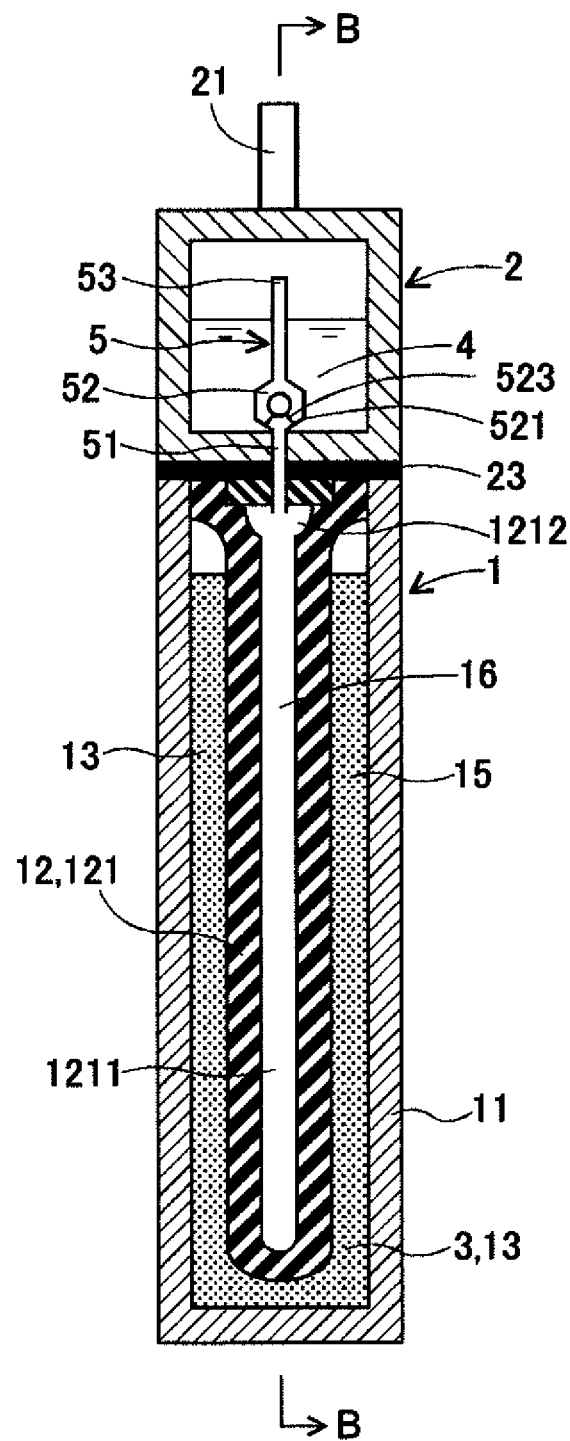
FIG. 2 is a side-view cross-sectional diagram of the sodium-sulfur battery 1 directed to First Embodiment.

FIG. 1 illustrates a sodium-sulfur battery according to the present embodiment in a vertical cross-sectional diagram, and FIG. 2 illustrates it in a side-view cross-sectional diagram. FIG. 2 is a cross-sectional diagram taken in the directions of arrows "A"-"A" shown in FIG. 1, and FIG. 1 is a cross-sectional diagram taken in the directions of arrows "B"-"B" shown in FIG. 2. As illustrated in FIGS. 1 and 2, the sodium-sulfur battery according the present embodiment comprises a battery body unit 1 and sodium container 2 which serve as the major component parts.

The battery body unit 1 comprises a metallic case 11, which corresponds to a sulfur container according to the present invention, and a partition wall 12. The case 11 is formed as a rectangular parallelepiped whose upper end is opened. The case 11 has a front face and rear face with a wide quadrangled configuration, paired side faces with vertically-long rectangled configuration, and a bottom face with a rectangled configuration. One of the side faces is provided with a cathode terminal 111 on the upper side.

The partition wall 12 comprises a partition-wall body 121 made of beta-alumina, and a lid 122 made of alpha-alumina. The partition-wall body 121 includes a lower portion with a thin-plated shape, and an upper portion with a flanged shape. The lower portion is provided with fine pores 1211. The fine pores 1211 are formed fully in the horizontal direction of the lower portion, are located at equal intervals, and are opened at the upper end, and are bottomed at the lower end. All of the fine pores 1211 are opened in a large opening section which is located in the flange-shaped upper portion to extend in the horizontal direction. The lid 122 is joined integrally with the opening section on the upper side. A space remaining in the opening section makes a corridor interspace 1212 which connects the fine pores 1211 with each other. Note that the fine pores 1211 and corridor interspace 1212 make an anode chamber 16 according to the present invention.

The partition wall 12 is accommodated in the case 11. Along with the partition wall 12, a current collector 13, which is formed of thick plate-shaped felt made of carbon fibers, is also accommodated in the case 11 so as to be located between the front face side of the partition wall 12 and the rear face side. The current collector 13 is impregnated with sulfur 3, which makes a cathode active material, to retain it. Under the circumstances, the partition wall 12, and the case 11 are assembled by fitting the former into the latter. In the assembled partition wall 12 and case 11, the side peripheral faces in the partition wall 12 are joined airtightly at the flange-shaped upper portion to the case 11 on the inner peripheral face. A space, which the inner faces of the case 11 and the outer faces of the partition wall 12 demarcate to retain the current collector 13 and sulfur 3, makes a cathode chamber 15 according to the present invention.

The sodium container 2 is made of stainless steel or aluminum alloy, is formed as a rectangular parallelepiped, and is provided with an anode terminal 21 on the upper face. The sodium container 2 is retained on an upper side of the battery body unit 1 by way of an intervening electric insulator 23. The sodium container 2 retains an anode active material made up of sodium 4.

A tubule-shaped communication passage 5 is disposed in the sodium container 2, and is provided with opposite ends, one of which is opened in the space inside the sodium container 2, and another of which is opened in the corridor interspace 1212 inside the partition wall 12 of the battery body unit 1. The communication passage 5 comprises: a lower tubule 51, which penetrates through the bottom wall of the sodium container 2, the electric insulator 23 and the lid 122 of the partition wall 12; a shutoff means 52; and an upper tubule 53. Both of the lower tubule 51 and upper tubule 53 are made of a fine stainless-steel tube whose axial bore makes a passage in which sodium flows.

The shutoff means 52 comprises a metallic shell portion 521 including a spherical space (or a float chamber) internally, and a hollow spherical valve 522 put in the internal space in the shell portion 521. Below the shell portion 521, the lower tubule 51 is joined so that one of the openings is opened in the internal space in the shell portion 521; above the shell portion 521, the upper tubule 53 is joined so that one of the openings (i.e., a finely-constricted portion) is opened in the internal space in the shell portion 521. Moreover, the valve 522 is located at position where it sits on a seat 533 made on an inner face of the shell portion 521, namely, it is located at around the middle of the internal space in the shell portion 521. Thus, the valve 522 is put in a state where it is kept at a position away from each of the openings of the lower tubule 51 and upper tubule 53. The valve 522 is formed so that the internal space gives a density of 1.5 g/cm$^3$ approximately to the valve 522. Consequently, the density is higher than the density of molten sodium (about 1.0 g/cm$^3$), and is lower than the densities of molten sulfur and molten sodium sulfide (about 2.0 g/cm$^3$).

The upper tubule 53 is made of a relatively long tubule, and is bent in an inverted letter-"U" shape so as to be opened at one of the opposite ends toward a lower section in the internal space in the sodium chamber 2. The upper tubule 53 makes the finely-constricted portion according to the present invention at a site at which it is connected with the shell portion 521.

The shutoff means 52 constructed as described above keeps the valve 522 to be seated on the seat 523 when molten sodium flows within the communication passage 5. Accordingly, each of the openings of the lower tubule 51 and upper tubule 53, which are opened in the internal space in the shutoff means 52, is put in the opened state. Consequently, the molten sodium flows within the shutoff means 52.

The communication passage 5 connects the sodium container 2 and the anode chamber 16 within the partition wall 12 through a space, and makes a passage for molten sodium moving between them. In addition to functioning as the passage for molten sodium, the communication passage 5 further has another function of reducing the rate of a flow of the molten sulfur 3 held in the cathode chamber 15 into the sodium container 2 through itself if the flow should have been caused by the partition wall 12 that should have been broken.

When molten sulfur flows into the sodium container 2 little by little, the molten sulfur reacts with molten sodium slightly as well so that they do not result in reacting with one another greatly. Thus, the heat of reaction generates so less as to make the temperature of the molten sodium higher a little bit. Moreover, the molten sulfur flowing into the sodium container 2 decreases the space within the sodium container 2 to make the pressure within the sodium container 2 higher. The pressure increase within the sodium container 2 is also brought about by the temperature heightening within the sodium container 2. In this way, the pressure within the sodium container 2 heightens little by little until the pressures become equal to one another at around the opposite end openings of the communication passage 5. Accordingly, the molten sulfur comes not to flow into the sodium container 2 through the communication passage 5. Consequently, the heat generation within the sodium container 2 comes not to grow so that the interior of the sodium container 2 stabilizes. Therefore, the sodium container 2 retains the molten sodium in the interior without ever making the molten sodium, which is held in the sodium container 2, come in contact with the molten sulfur.

Meanwhile, within the battery body unit 1, if the partition wall 12 should have been broken, the molten sodium, which is held in the anode chamber 16 constituted of the fine pores 1211 and corridor interspace 1212 in the partition wall 12, makes contact directly with the molten sulfur, which is held in the cathode chamber 15 outside the partition wall 12. However, the spaces in the anode chamber 16 are extremely small or limited spaces, because they are formed of the fine pores 1211 and corridor interspace 1212 alone. Accordingly, an amount of the molten sodium, which is retained within the anode chamber 16, is also less. Consequently, even if all of the molten sodium, which is held in the anode chamber 16, should have reacted with the molten sulfur, an amount of the generation of heat is not so much. Even when the not-so-much amount of the generation of heat increases all of the molten sulfur, which exists in a large amount, and the partition wall 12 in the temperature, the temperatures do not rise high so much. Therefore, no ignition or explosion results from the battery body unit 1 that is heated likewise only slightly. When the broken partition wall 12 should have caused the sodium-sulfur battery according to the present embodiment to lose the functions as a battery, the exterior deprives the heat of the present sodium-sulfur battery, which exhibits the temperature of higher than 300° C. The temperature of the battery thus decreases. Moreover, when the present battery exhibits a temperature of lower than 100°, the molten sulfur as well as the molten sodium solidify, turning into extremely stable substances that do not show any functions of battery.

The shutoff means 52 held in the communication passage 5 enhances the above-described safety function of the communication passage 5 more. That is, if the partition wall 12 should have broken so that the molten sulfur held in the cathode chamber 15 should have tried to flow into the sodium container 2 through the communication passage 5, the shutoff means 52 stops the molten sulfur to prevent it from flowing into the sodium container 2. If the molten sulfur should have flown into the shell portion 521 of the shutoff means 52 through the lower tubule 51 of the communication passage 51, the molten sulfur (which has the higher density of 2.0 g/cm$^3$ approximately) floats the hollow spherical valve 522 (which is held in the shell portion 521 and has the lower density of 1.5 g/cm$^3$ approximately), lifting the valve 522 upwardly. Moreover, the valve 522 is pressed against the opening of the upper tubule 53, which opens in the shell portion 521, by the molten sulfur, plugging up the opening. Thus, the shutoff means 52 prevents the molten sulfur from flowing into the sodium container 2 through the upper tubule 53 by closing the opening of the upper tubule 53. Accordingly, the molten sodium, which is retained within the sodium container 2 in a large amount, is blocked off from the molten sulfur, which is held in the cathode chamber 15. Consequently, the molten sodium and molten sulfur neither make contact with one another nor react with one another at all.

Since the shutoff valve 522 thus stops the flow of the molten sulfur before the molten sulfur flows into the sodium container 2, it is able to more reliably prevent the molten sodium, which is held in the sodium container 2 in a large amount, and the molten sulfur, which is held in the cathode chamber 15 in a large amount, from making contact with or reacting with one another.

The sodium-sulfur battery according to the present embodiment is employed with the sodium container 2 placed on the top. Moreover, the sodium container 2 and anode chamber 16 are employed with the interiors depressurized or vacuumed. On the contrary, the cathode chamber 15 is employed under an atmospheric pressure, or under a reduced pressure where it is subjected to a higher pressure than that in the anode chamber 16. As a result, a pressing force is applied onto the partition wall 12 in a direction from the outer peripheral face toward the anode chamber 16 so as not to make any tensile stress act on the partition wall 12.

As the present sodium-sulfur battery discharges and charges in the same manner as conventional sodium-sulfur batteries discharge and charge, the operations of the sodium-sulfur battery according to the present invention, such as the discharging and charging operations, are not fully described herein for the purpose of concisely describing the present invention.

Second Embodiment

Figure 3:
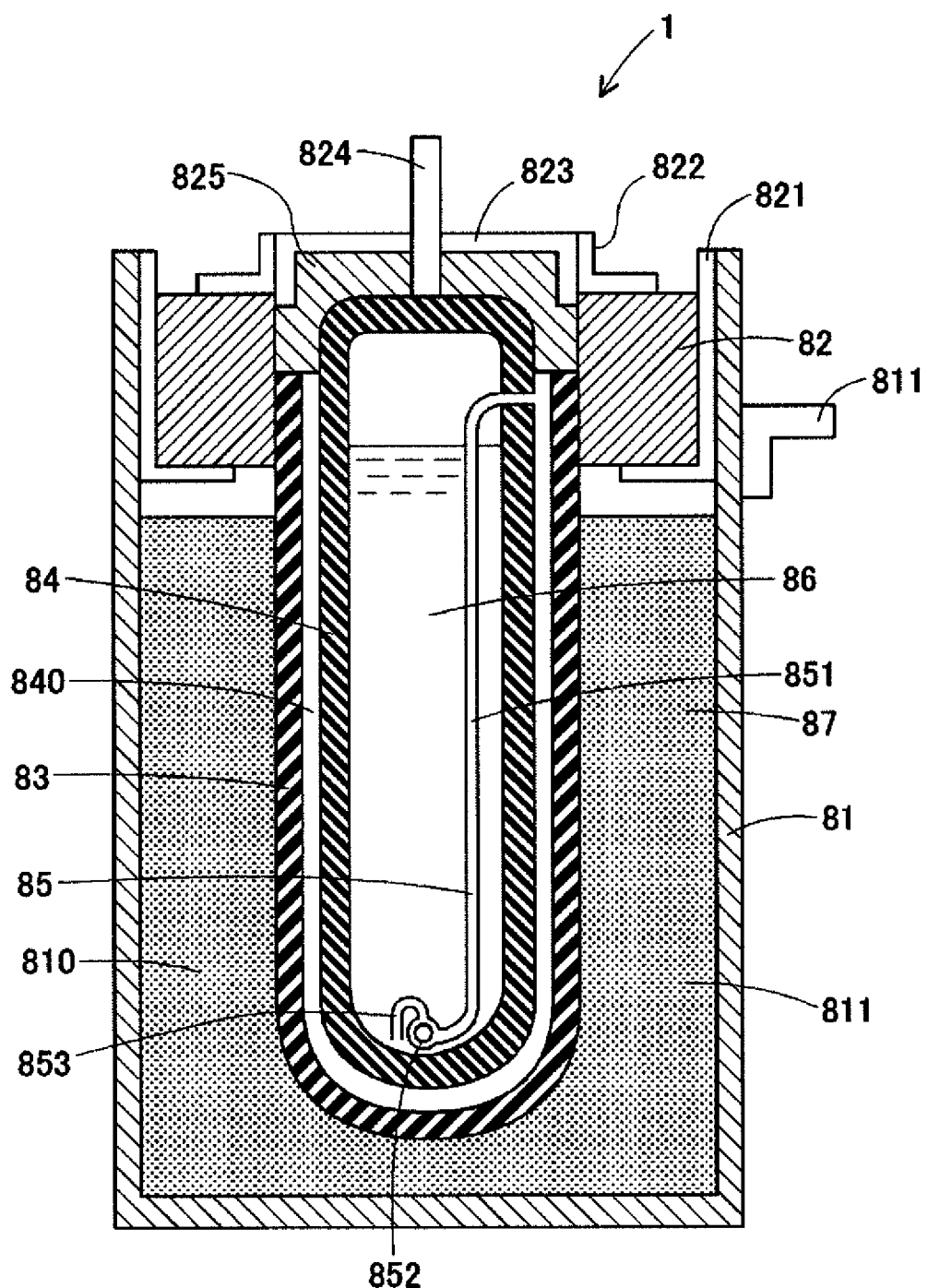
FIG. 3 is a vertical cross-sectional diagram of a sodium-sulfur battery 1 directed to Second Embodiment.

FIG. 3 illustrates a vertical cross-sectional diagram of a sodium-sulfur battery 1 according to Second Embodiment. Basically, the sodium-sulfur battery 1 according to the present embodiment operates and effects advantages in the same as First Embodiment does. Therefore, the present sodium-sulfur battery 1 will be hereinafter described while focusing on the constituents that are distinct from those of First Embodiment.

As illustrated in FIG. 3, the sodium-sulfur battery 1 according to Second Embodiment comprises the following principal constituent elements: a protective can 81 disposed so as to surround the battery, and formed as a tubular shape opened at the upper end and bottomed at the lower end; an insulator ring 82 installed onto the inner peripheral face of the protective can 81 on the upper side, and formed as an annular shape; a partition wall 83 retained onto the inner peripheral face of the insulator ring 82, formed as a tubular shape opened at the upper end and bottomed at the lower end, and formed of beta-alumina; a metallic sodium container 84 retained onto the partition wall 83 on the inner-peripheral-face side, and formed as a tubular shape closed at the upper and lower ends; a communication passage 85 opened in the bottom of the sodium container 84, and opened in the outer peripheral wall of the sodium container 84 on the upper side; molten sodium 86 serving as an anode active material; and molten sulfur 87 serving as a cathode active material.

The protective can 81 is made of metal, and has a bottomed tubular configuration, and is provided with a cathode terminal 811 installed onto the side face on the upper side.

The partition wall 83 is retained onto the inner-peripheral-face side of the protective can 81. The partition wall 83 is formed of beta-alumina, a solid electrolyte through which sodium ions Na$^+$ permeate, and has a tubular shape opened at the upper end and bottomed at the lower end. A space, which is surrounded by the inner peripheral face of the partition wall 83 and the outer peripheral face of the sodium container 84, makes an anode chamber 840; another space, which is surrounded by the outer-peripheral-face side of the partition wall 83 and the inner peripheral face of the protective can 81, makes a cathode chamber 810.

The sodium container 84 is retained onto the inner-peripheral-face side of the partition wall 83, is made of metal, and has a tubular shape closed at the upper and lower ends.

The communication passage 85 comprises: a first fine tubed portion 851 made of metal, formed as a fine tubed-shape, and having an end opening which penetrates through the upper wall face of the sodium container 84 and then opens in the anode chamber 840; a shutoff portion 852 in which another end of the first fine tubed portion 851 opens; and a second fine tubed portion 853 having an end opening in the shutoff portion 852, and another end opening in the lower site of the sodium container 84. The communication passage 85 is constructed identically with the communication passage 5 according to First Embodiment. Each of the first fine tubed portion 851, shutoff portion 852 and second fine tubed portion 853 is constructed identically with the lower tubule 51, shutoff means 52 and upper tubule 53 according to First Embodiment.

An inert gas is sealed up in the upper space within the sodium chamber 84. A gaseous pressure resulting from the inert gas acts on the molten sodium 86 to push down the liquid level, urging the molten sodium 86 so as to be pushed out toward the anode chamber 840 via the communication passage 85.

The insulator ring 82 is installed onto the protective can 81 on the upside by a retainer fitting 821. Moreover, the partition wall 83 is installed on the upper side onto the inner-peripheral side face of the insulator ring 82 on the diametrically inner side, and an anode retainer fitting 822 is installed onto the insulator ring 82 on the upper face. The anode retainer fitting 822 retains an anode lid 823 covering the partition wall 83 and sodium container 84 on the upper side. At the middle in the anode lid 823, a rod-shaped anode terminal 824, which sticks out the anode lid 823 from the upper end face of the sodium container 84, is disposed so as to be electrically continuous to and from the sodium container 84.

In a space above the upper end of the partition wall 83 within the anode chamber 840, a spacer 825 is disposed to bury the space.

In the cathode chamber 810, a current collector 811, which is formed of felt made of carbon fibers, is disposed.

The sodium 86 comprises a major part, which is accommodated in the sodium container 84, and a remaining minor part, which is accommodated in the anode chamber 840 in a small amount.

When the sodium-sulfur battery 1 according to Second Embodiment is discharged, the sodium within the anode chamber 840 passes through the partition wall 83 to enter the cathode chamber 810, and then reacts with the sulfur to turn into sodium polysulfide. The sodium, which has been decreased by the discharging operation inside the anode chamber 840, is replenished from the sodium held in the sodium container 84 by way of the communication passage 85. Conversely, when the present sodium-sulfur battery 1 is charged, the sodium polysulfide within the cathode chamber 810 turns into sodium ions, and the resulting sodium ions then pass through the partition wall 83 to move to the anode chamber 840. The sodium, which has increased inside the anode chamber 840, enters the interior of the sodium container 84 by an amount increased via the communication passage 85, and against a dwelling pressure kept inside the sodium container 84.

Note however that, since the functions and/or roles of the communication passage 85 are the same as those of the communication passage 5 according to First Embodiment when the partition wall 83 should have been broken, they will not be described herein.

The sodium-sulfur battery 1 according to the present embodiment does not comprise any special part that exits between the inner peripheral face of the partition wall 83, which demarcates the anode chamber 840, and the outer peripheral surface of the sodium container 84. Therefore, it is possible to make narrower the gap between the outer peripheral face of the sodium container 84 and the inner peripheral face of the partition wall 83. Accordingly, the narrowed gap makes the anode chamber 840 smaller in the capacity. Consequently, the anode chamber 840 with a diminished capacity holds the sodium less. Hence, the heat of reaction is likewise generated less by the reaction which might occur between the sodium retained within the anode chamber 840 and the sulfur retained within the cathode chamber 810 when the partition wall 83 should have been broken. Thus, it is also less probable that the present sodium-sulfur battery 1 suffers from a fire, or the like, which is due to the partition wall 83 when it should have been broken.

The invention claimed is:

1. A sodium-sulfur battery comprising:
 a partition wall comprising an beta-alumina solid-electrolyte;
 a cathode chamber formed on one of opposite sides of the partition wall;
 an anode chamber formed on another one of the opposite sides of the partition wall;
 sulfur accommodated in the cathode chamber;
 sodium, wherein some of the sodium is accommodated in the anode chamber;
 a sodium container accommodating most of remaining sodium; and
 a communication passage comprising a finely-perforated portion which communicates the anode chamber with the sodium container;
 wherein the communication passage further comprises a shut-off structure provided with: a finely-constricted portion; and a float whose density is higher than a density of sodium and is lower than densities of sulfur and sodium sulfide, and which closes the finely-constricted portion by being floated with the sulfur or sodium sulfide infiltrating into the communication passage through a damaged site when the partition wall is damaged.

2. The sodium-sulfur battery of claim 1, wherein the finely-perforated portion comprises a tubule.

3. The sodium-sulfur battery of claim 1, wherein:
 the partition wall comprises a plate-shaped body;
 the anode chamber is formed inside the plate-shaped body;
 the cathode chamber is formed on an outer circumferential side of the plate-shaped body; and
 the sodium-sulfur battery further comprises a sulfur container demarcating the cathode chamber.

4. The sodium-sulfur battery of claim 1, wherein:
 the partition wall comprises a tube-shaped body opened at an upper end thereof and closed at a lower end thereof;
 the sodium container comprises a lower segment, at least the lower segment located on an inner side of the tube-shaped body;

the anode chamber is formed between an inner peripheral face of the tube-shaped body and a lower outer peripheral face of the sodium container;

the sodium-sulfur battery further comprises a sulfur container accommodating the partition wall therein and demarcating the cathode chamber; and the communication passage has an end opened on an upper side of the anode chamber, and another end opened on a lower side of the sodium container.

* * * * *